S. L. MARTIN.
AUTOMATIC LUBRICANT SUPPLY SYSTEM FOR INTERNAL COMBUSTION ENGINES.
APPLICATION FILED APR. 23, 1918. RENEWED JUNE 24, 1919.

1,328,843.

Patented Jan. 27, 1920
2 SHEETS—SHEET 1

Inventor
S. L. Martin

By
Lacey & Lacey, Attorneys

Witnesses

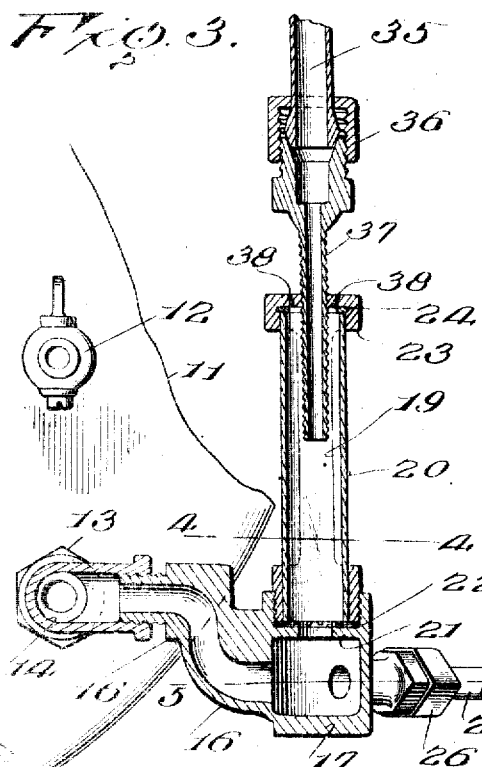
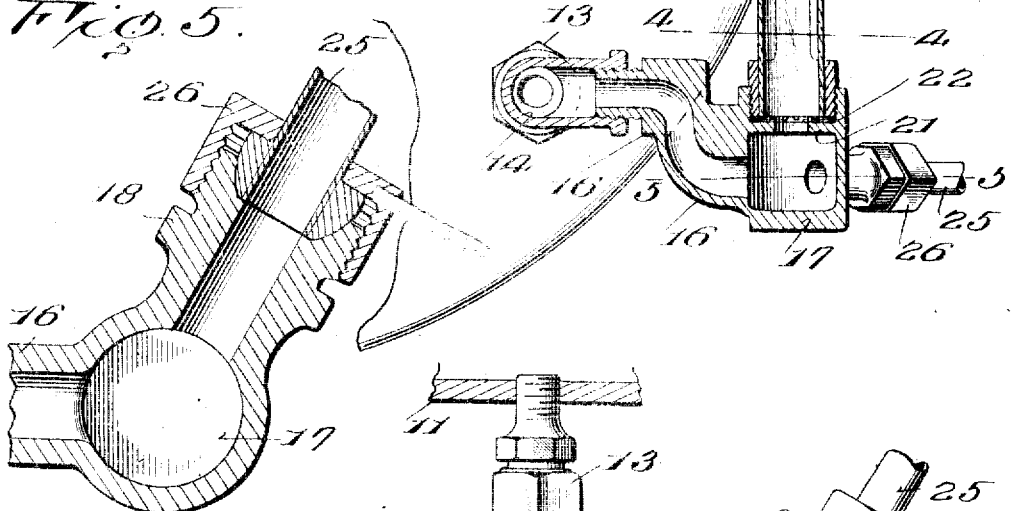
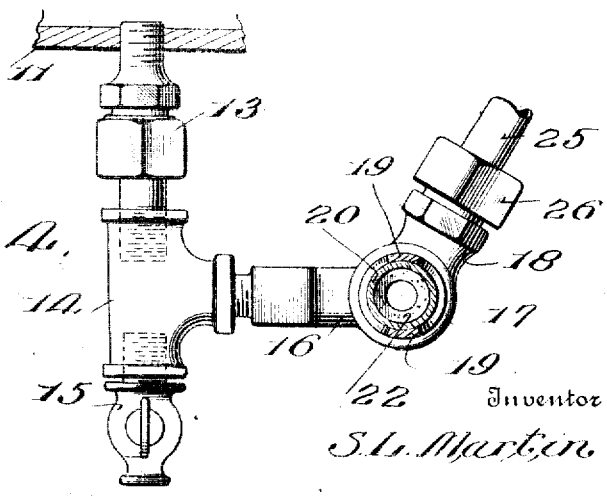

UNITED STATES PATENT OFFICE.

STEVIE L. MARTIN, OF SNYDER, OKLAHOMA.

AUTOMATIC LUBRICANT-SUPPLY SYSTEM FOR INTERNAL-COMBUSTION ENGINES.

1,328,843.  Specification of Letters Patent.  Patented Jan. 27, 1920.

Application filed April 23, 1918, Serial No. 230,305. Renewed June 24, 1919. Serial No. 306,464.

*To all whom it may concern:*

Be it known that I, STEVIE L. MARTIN, a citizen of the United States, residing at Snyder, in the county of Kiowa and State of Oklahoma, have invented certain new and useful Improvements in Automatic Lubricant-Supply Systems for Internal-Combustion Engines, of which the following is a specification.

This invention relates to an automatic lubricant supply system for motor vehicles and has as its primary object to provide a construction wherein the lubricant will be automatically supplied to the crank case of the engine and maintained at a predetermined level therein.

The invention has as a further object to provide an arrangement wherein the device may be adjusted for varying the level at which the lubricant shall be maintained in the crank case.

A still further object of the invention is to provide a construction employing a lubricant supply tank and wherein the discharge of lubricant from the said tank to the crank case of the engine will be regulated by the control of the vent for the said tank.

A still further object of the invention in this connection is to provide a construction wherein the lubricant, upon reaching a predetermined level in the crank case, will close the vent to the supply tank for thus cutting off further discharge of the lubricant from the supply tank.

The invention has as a still further object to provide a construction employing a sight tube whereby the level of the lubricant in the engine crank case may be readily observed and also whereby the position of adjustment of the regulating screw controlling the venting of the supply tank may also be easily ascertained.

And the invention has as a still further object to provide a safety cut off for the discharge pipe of the supply tank making it impossible to open or fill the tank except when said discharge tube is closed and thereby avoiding possible flooding of the engine crank case.

Other and incidental objects will appear as the description proceeds, and in the drawings wherein I have illustrated the preferred embodiment of the invention, and wherein similar reference characters designate corresponding parts throughout the several views:

Figure 1 is a fragmentary side elevation showing my improved supply system in connection with a conventional type of motor vehicle engine.

Fig. 2 is a perspective view illustrating the system more in detail,

Fig. 3 is a fragmentary vertical sectional view particularly illustrating the mounting of the sight tube of the system as well as the mounting of the regulating screw employed, Fig. 4 is a fragmentary horizontal sectional view taken on the line 4—4 of Fig. 3 and particularly showing the construction of the protecting cage for the sight tube, and Fig. 5 is a fragmentary sectional view taken on the line 5—5 of Fig. 3.

In order that the construction and operation of my improved system may be accurately understood I have, in the drawings, shown the system in connection with a conventional type of motor vehicle engine 10 having a crank case 11. This crank case is, at one side thereof, provided at its rear end with the usual vertically spaced oil level tests cocks, the uppermost one of which is shown at 12.

In order that the present invention may be connected with the crank case the lowermost test cock is removed, and threaded into the opening normally occupied by such lower test cock, is a union 13 to which is connected a T coupling 14 carrying a drain cock 15 at its outer end. Threaded into the side outlet of the T coupling is the lateral outlet 16 of a stand pipe or sight tube supporting member. This member includes, as particularly shown in Fig. 3 of the drawings, a hollow body 17 from one side of which the outlet 16 leads and extending from the body at its opposite side is a nipple 18. Threaded into the upper end of the body is a protecting cage 19 for a transparent stand pipe or sight tube 20. This sight tube is supported at its lower end by an annular flange 21 within the body 17 of the supporting member and is rested upon a suitable gasket 22 seating against the said flange. At its upper end the sight tube is closed by a cap 23 carried by the cage and interposed between the said cap and the upper edge of the tube is a suitable gasket 24. Thus it will be seen that the cage may be adjusted within the upper end of the body 17 of the supporting member for tightly clamping the sight tube in position between the gaskets 22 and 24.

Extending from the nipple 18 of the supporting member is a pipe 25 connected at one end with the said elbow by a suitable union nut 26. At its opposite end this pipe communicates with an elbow 27 extending from the bottom of a lubricant supply tank 28 and is connected with the said elbow by a suitable union nut 29. Interposed in the length of the pipe is a cut off valve 30 of approved type which is located in a plane adjacent to the rear end of the tank. The tank 28 is preferably formed of suitable sheet metal and is provided with a filler tube 31 disposed adjacent the outer rear corner of the tank and removably receiving a plug 32 providing an airtight closure for the tank. As particularly brought out in Fig. 1 of the drawings, the tank is mounted on a level above the upper end of the sight tube 20 and is preferably seated upon the ledge of the engine crank case 11 at the adjacent side thereof to be held upon the said ledge by the engine intake manifold. However, any other suitable means may be employed for securing the tank in position and it will be seen that by thus locating the tank, the lubricating oil therein will be kept warm and fluent in cold weather.

Fitted through the top wall of the tank is an elbow 33 and extending from this elbow is a flexible vent pipe 34 connected to the said elbow by a suitable union 35. This pipe extends downwardly and rearwardly from the tank to a point over the upper end of the sight tube 20 and, at its free extremity, is connected by a union 36 to the upper enlarged end of a hollow regulating screw 37 threaded through the cap 23 of the cage 19 for the sight tube to extend axially within the said tube. Thus, the tank 28 will be vented from within the sight tube through the regulating screw 37 and pipe 34, the cap 23 of the cage being provided with suitable vent openings 38.

In use, the valve 30 is first closed, when the plug 32 of the tank 28 is removed and the tank filled with suitable lubricating oil. The plug is then replaced to close the tank airtight and the valve again opened. Upon the opening of this valve the lubricant from the tank will, as will now be clear, flow through the pipe 25 and through the sight tube supporting member into the crank case 11 of the engine. As the level of the lubricating oil rises within the crank case, the oil level in the sight tube 20 will rise accordingly until the lower end of the regulating screw 37 becomes submerged to close the said screw. Supply of air to the tank for displacing the oil discharged therefrom will thus be automatically cut off at the regulating screw by the oil within the sight tube so that no additional oil will then be permitted to flow into the crank case. However, as the oil in the crank case is used up by the running of the engine and the level of the oil in the crank case is again lowered to consequently expose the inner end of the regulating screw, a further supply of oil from the tank will then be immediately permitted to flow into the crank case for maintaining the oil in the crank case at a constant level. I therefore provide a system wherein the oil will be automatically supplied to the crank case and maintained at a constant level therein. In this connection it will now be also readily seen that the level at which the oil in the crank case shall be maintained may be readily varied by simply adjusting the regulating screw 37 vertically within the sight tube, the position of the inner end of this tube vertically with respect to the crank case determining the level to which the oil shall rise in the crank case when the flow of oil from the tank will be cut off. Obviously, this construction provides a very desirable and convenient arrangement since by making tests of engine efficiency at different levels of oil in the crank case, a particular level at which the engine will operate most effectively may be discovered. This level determined, my improved system will then automatically operate to maintain the lubricant within the crank case at such level. In order that a positive check may be had upon the operation of the system the transparent stand pipe or sight tube 20 is employed so that the level of the oil in the crank case may always be positively determined by glancing at this tube. In this connection it will be noted that the lateral outlet 16 of the sight tube supporting member rises above the lower end of the sight tube so that oil flowing through the said member will always be visible within the tube. Should the T coupling 14 and its connection become clogged, the upper test cock 12 of the crank case, being unaffected by the application of my system to the engine, may be opened for determining the level of the oil in the crank case, and in any instance where such clogging should occur the drain cock 19 may, of course, be opened for clearing the said coupling and connection. Furthermore, this cock provides a means whereby the crank case may, when desired, be drained of the lubricating oil therein.

Connected to the rear end wall of the tank are spaced vertically alined brackets 39 and rotatably fitted through these brackets is an operating rod 40. At its lower end this rod is formed with a fork 41 axially engaged with the plug stem of the valve 30 while, at its upper end, the said rod is formed with a laterally directed terminal or handle 42 movable, when the valve is open, to extend over the closure plug 32 of the tank and thus lock this latter plug against accidental displacement. Consequently, it will be seen that under normal conditions, the closure plug 32 cannot become loosened to vent the tank and cause consequent flooding of the engine crank case. Furthermore, this plug cannot be removed until the handle 42 of the rod 40 has been rotated to close the valve 30. Therefore, when filling the tank, a fresh supply of lubricant cannot be introduced into the tank until after the valve 30 has been closed. Flooding of the engine crank case, when so filling the tank, will accordingly also be prevented. It will thus be seen that the rod 40 with its handle 42 provides a safety cut off for the tank as well as lock for the tank closure plug.

It will, therefore, be seen that I provide a very effective construction for the purpose set forth and while I have illustrated the system as applied to an engine the crank case of which is normally fitted with oil level test cocks, still it will be understood that my improved system may be used with equal efficiency upon various other motor vehicle engines.

Having thus described the invention, what is claimed as new is:

1. A supply system for internal combustion engines including a stand pipe adapted for connection with an engine crank case, a supply tank, a closure plug therefor, a feed pipe leading from the supply tank to the stand pipe, a cut off valve interposed in the said feed pipe, means for automatically controlling discharge of lubricant from the tank by the rise and fall of lubricant in the stand pipe, and an operating rod for the cut off valve provided with a handle adapted to overlie the closure plug of the tank when the said valve is open to provide a lock for the said plug.

2. A supply system for internal combustion engines including a supply tank adapted for connection with an engine crank case, closure means for the tank, means for cutting off discharge from the tank, vent means for the tank adapted to automatically control the discharge of lubricant therefrom, and operating means for said cut off means adapted to permit release of said closure means only when the cut off means is closed.

3. A lubricant supply system for internal combustion engines including a supporting member having a body hollowed out to provide a chamber, a stand pipe mounted upon the body and communicating with the upper end of said chamber, an outlet leading from the bottom portion of said chamber and having its passage extending across the plane of the bottom end of said stand pipe, an inlet leading into the chamber, the outlet being adapted for attachment to an engine crank case, a supply tank connected with the inlet, and means for venting the tank and adapted to be closed by the rise of lubricant within the stand pipe.

4. A lubricant supply system for internal combustion engines including a supporting member having a body hollowed out to provide a chamber and provided with a flange projecting into the chamber adjacent the upper end thereof, a stand pipe rested at its lower end upon said flange to communicate with the upper end of said chamber, means engaging over the stand pipe and connecting the pipe with the body, an inlet leading into the chamber, an outlet leading from the bottom portion of the chamber and having its passage extending across the plane of the bottom end of said stand pipe, said outlet being adapted for attachment to an engine crank case, a supply tank connected with the inlet, and means for venting the tank and adapted to be closed by the rise of lubricant within the stand pipe.

5. A supply system for internal combustion engines including a supply tank adapted for connection with an engine crank case, a closure plug for the tank, vent means for the tank adapted to automatically control the discharge of lubricant therefrom, a cut off valve controlling discharge from the tank, means for operating the valve, and means carried by said latter means to coact with the closure plug when the valve is open for locking the plug against displacement.

6. A supply system for internal combustion engines including a supply tank adapted for connection with an engine crank case, closure means for the tank, means for cutting off discharge from the tank, vent means for the tank adapted to automatically control the discharge of lubricant therefrom, operating means for said cut off means, and means carried by said operating means to coact with the closure means when said cut off means is open for locking the closure means against displacement.

In testimony whereof I affix my signature.

STEVIE L. MARTIN. [L. S.]